United States Patent [19]

Lee et al.

[11] Patent Number: 5,555,001
[45] Date of Patent: Sep. 10, 1996

[54] REDUNDANT SCHEME FOR LCD DISPLAY WITH INTEGRATED DATA DRIVING CIRCUIT

[75] Inventors: Sywe N. Lee, Taipei; Huann-Min Tang; Dyi-Chung Hu, both of Shinchu, all of Taiwan

[73] Assignee: Prime View HK Limited, Hong Kong, Hong Kong

[21] Appl. No.: 207,759

[22] Filed: Mar. 8, 1994

[51] Int. Cl.$^6$ ............................................. G09G 3/36
[52] U.S. Cl. ........................... 345/93; 345/103; 327/526
[58] Field of Search ............................ 345/93, 90, 103, 345/100, 98, 205, 206, 92; 327/526; 359/59, 55, 62, 54

[56] References Cited

U.S. PATENT DOCUMENTS

| | | | |
|---|---|---|---|
| Re. 33,829 | 2/1992 | Castleberry | 345/92 |
| 4,334,310 | 6/1982 | Maley | 371/64 |
| 4,368,523 | 1/1983 | Kawate | 345/93 |
| 4,666,252 | 5/1987 | Yaniv et al. | 350/333 |
| 4,676,761 | 7/1987 | Boujois | 345/93 |
| 4,688,869 | 8/1987 | Castleberry | 345/103 |
| 4,775,861 | 10/1988 | Saito | 345/93 |
| 4,789,857 | 12/1988 | Maurice | 345/93 |
| 4,804,953 | 2/1989 | Castleberry | 345/206 |
| 4,820,222 | 4/1989 | Holmberg | 345/93 |
| 4,851,827 | 7/1989 | Nicholas | 345/205 |
| 4,917,467 | 4/1990 | Chen et al. | 350/332 |
| 4,922,240 | 5/1990 | Duwaer | 345/100 |
| 4,936,656 | 6/1990 | Yamashita | 350/333 |
| 4,938,566 | 7/1990 | Takeda | 350/332 |
| 4,963,860 | 10/1990 | Stewart | 345/206 |
| 4,990,905 | 2/1991 | Kuijk | 345/210 |
| 4,994,796 | 2/1991 | Kuijk | 345/93 |
| 5,033,823 | 7/1991 | Shannon | 345/91 |
| 5,038,368 | 8/1991 | Lee | 377/28 |
| 5,062,690 | 11/1991 | Whetten | 345/92 |
| 5,063,378 | 11/1991 | Roach | 345/98 |
| 5,075,674 | 12/1991 | Katayama | 345/93 |
| 5,103,330 | 4/1992 | Fukami et al. | 359/59 |
| 5,111,060 | 5/1992 | Asada | 307/219 |
| 5,130,703 | 7/1992 | Fairbanks | 426/330.1 |
| 5,132,677 | 7/1992 | Nicholas | 345/92 |
| 5,148,248 | 9/1992 | Possin et al. | 357/23.7 |
| 5,151,632 | 9/1992 | Troxell | 345/75 |
| 5,159,477 | 10/1992 | Shimada et al. | 359/59 |
| 5,164,851 | 11/1992 | Kanemori et al. | 359/59 |
| 5,170,155 | 12/1992 | Plus | 345/100 |
| 5,173,792 | 12/1992 | Matsueda | 359/59 |
| 5,224,102 | 7/1993 | Plus | 371/22.1 |
| 5,235,272 | 8/1993 | Henley | 324/158 R |
| 5,250,931 | 10/1993 | Misawa | 345/206 |
| 5,268,678 | 12/1993 | Nakajawa et al. | 345/93 |
| 5,426,447 | 6/1995 | Lee | 345/206 |

OTHER PUBLICATIONS

Castleberry et al., "A 1 Mega Pixel Color a–Si TFT Liquid-Crystal Display" *SID Digest*, pp. 232–234, 1988.
Takeda et al., "12.5" LCD Addressed by a–Si TFTs Employing Redundance Technology", *Japan Display*, pp. 204–207, 1986.
Hotta et al., "Full Color Multi–Gap LC–TV Display Panel Addressed by a–Si TFTs" *SID Digest*, pp. 296, 297, 1986.

*Primary Examiner*—Richard Hjerpe
*Assistant Examiner*—Lun-Yi Lao
*Attorney, Agent, or Firm*—Jones, Day, Reavis & Pogue

[57] ABSTRACT

An LCD display having at least one redundant data driving circuit on a substrate that can be substituted for a defective data driving circuit on the substrate. These redundant subcircuits are exact copies of a column driving subcircuit except that some of the connecting points to the control and driving signal lines are not hardwired. That is, the connecting points are left as potential welding points. If a column driving circuit that is coupled to a particular input data line is damaged, then a redundant data driving subcircuit can be hardwired by welding the corresponding crossing points to compensate the damaged circuit. The damaged circuit is also disconnected (by using a laser cut or compatible methods) from the corresponding input data line and the internal data line as necessary.

10 Claims, 6 Drawing Sheets

REDUNDANT SCHEME FOR LCD DISPLAY WITH INTEGRATED DATA DRIVING CIRCUIT

BACKGROUND OF THE INVENTION

1. Field of the Invention

The present invention relates generally to LCD displays and their associated driving circuits and in particular to LCD display column driving circuits that use redundant circuits to compensate for any damaged columns or column data driving circuits.

2. Description of Related Art

An active matrix liquid crystal display device commonly comprises a plurality of picture elements, arranged in a matrix of rows and columns supported on a substrate. Each picture element consists of a switching transistor, a liquid crystal cell that can be modeled electrically as a capacitor and known as a pixel capacitor, and an optional storage capacitor. One of the electrodes of the pixel capacitor is on one side of the matrix display and a common electrode for all of the pixel capacitors is formed on the opposite side of the matrix display. The substrates are separated by a layer of electro-optic material. A pixel element including a liquid crystal cell and an optional storage capacitor are driven by a thin-film transistor (TFT) as a switching device. The transistor is used for transferring an input data signal to the corresponding pixel element.

The resolution of the picture is defined as the number of pixels in a display area. In a conventional, unscanned LCD display with X columns and Y rows, the display actually requires X+Y column and row driver leads. Therefore, it is clear, in the case of unscanned LCD displays, that the greater the number of pixels in a display area, the more input leads are required to connect external signals to the LCD display. One solution to the problem is to integrate a data driver circuit directly on the display substrate, which is typically of glass. This would reduce the number of input leads and external driving chips drastically. An integrated data driving circuit for LCD displays is described in commonly assigned co-pending application Ser. No. 971,721 filed Nov. 3, 1992, and entitled "Data Driving Circuit for LCD Display". The invention therein discloses a data driver circuit that uses a multiplexing arrangement to reduce the number of input data signal lines. Many times, in the manufacturing of such display devices, a damaged section of the data driver circuit, caused primarily by defects such as bad transistors, shorted lines, open lines, interlayer shorts and the like as well as open data lines inside of the display area, can lead to the corresponding data lines malfunctioning. In these cases, a redundant data driver circuit is usually required to compensate for these otherwise irreversible defects. As a result, the manufacturing yield is increased and the manufacturing cost is reduced.

It would be advantageous to provide a redundant data driving circuit on the substrate of an active matrix liquid crystal display device. In such case, damaged transistors and/or damaged lines in a column driver subcircuit could be replaced so as to form an acceptable display device.

SUMMARY OF THE INVENTION

The present invention overcomes the disadvantages of the prior art by providing a number of redundant column data driving subcircuits to the data driving circuits on the substrate. These redundant subcircuits are exact copies of a column driving subcircuit except that some of the connecting points to the control and driving signal lines are not hardwired. That is, the connecting points are left as potential welding points. For example, if a column driving circuit that is coupled to a particular input data line is damaged, then a redundant data driving subcircuit can be hardwired by welding the corresponding crossing points to compensate the damaged circuit. The damaged circuit is also disconnected (by using a laser cut or compatible methods) from the corresponding input data line and the internal data line as necessary.

Thus, it is an object of the present invention to have redundant data driving subcircuits to compensate for damage to data driving circuits for an integrated driver display device.

It is another object of the present invention to have redundant data driving subcircuits to compensate for any broken data lines inside of the display area for an integrated driver display device.

It is still another object of the present invention to use minimal area and wiring to implement the redundant data driving subcircuits for an integrated driver display device.

It is also an object of the present invention to reduce the adverse effects of fatal data line defects of an integrated driver liquid crystal display device.

It is yet another object of the present invention to increase the manufacturing yield and to reduce the manufacturing costs of an integrated driver display device.

Thus, the present invention relates to a data driver system for correcting defects in an active matrix liquid crystal display formed of picture elements in rows and columns on a substrate, the data driver circuit system comprising a primary data driver circuit on the substrate and coupled to each corresponding column of the active matrix liquid crystal display for supplying data to the corresponding columns, at least one redundant data driver circuit on the substrate, and connection means on the substrate for selectively enabling the replacement of any defective primary data driver circuit with at least one redundant data driver circuit.

BRIEF DESCRIPTION OF THE DRAWINGS

These and other objects of the present invention will be more fully understood when taken in conjunction with the following DETAILED DESCRIPTION OF THE DRAWINGS in which like numerals represent like elements and in which.

DETAILED DESCRIPTION OF THE DRAWINGS

Figure 1:
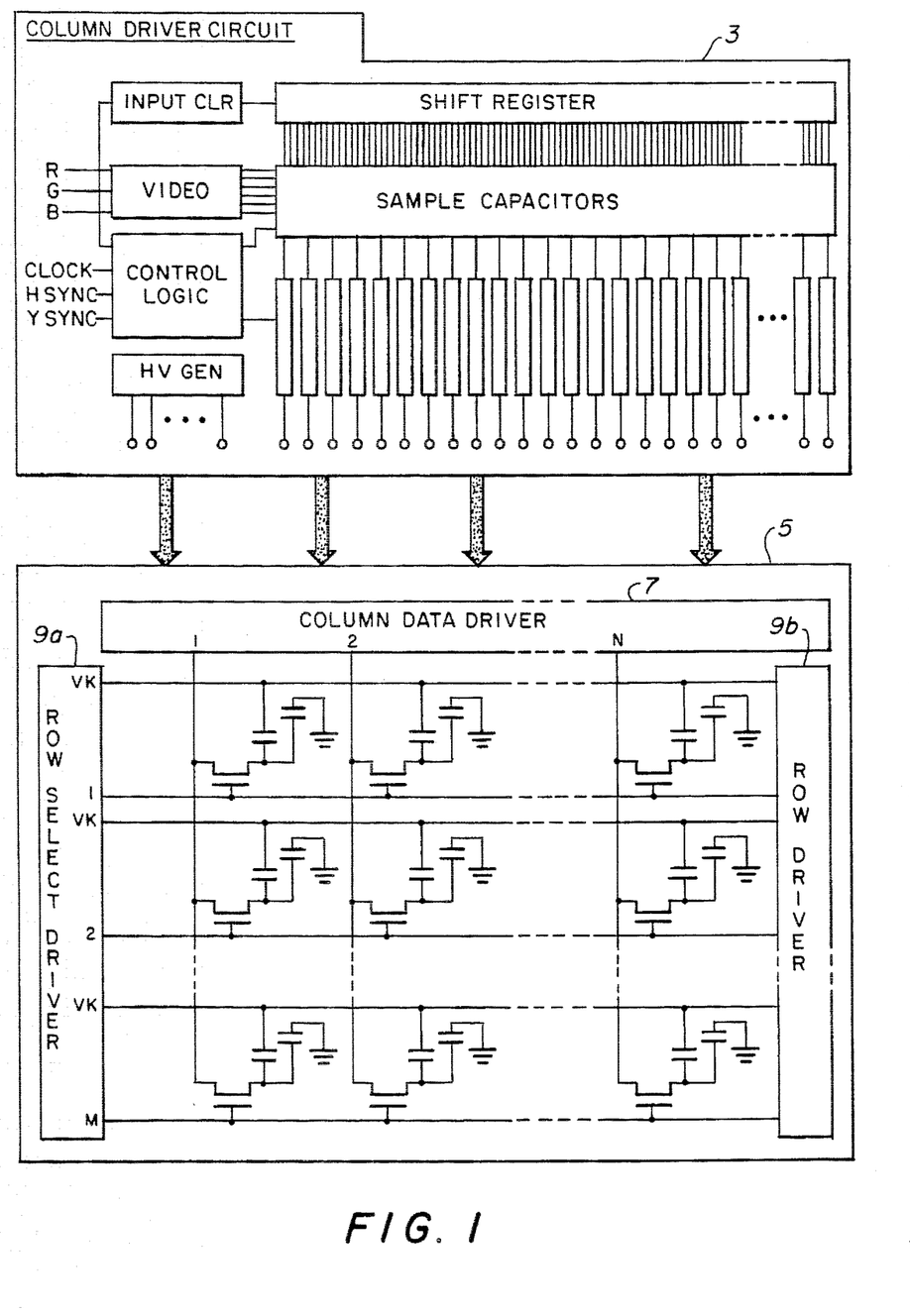
FIG. 1 is a basic block diagram of a display system that includes a display device having a thin-film transistor (TFT) array, an integrated driver circuit, and a peripheral control/drive circuit.

A basic diagram of the display system that incorporates the present invention is illustrated in FIG. 1 and includes the external driver/control circuits 3 coupled to an active matrix liquid crystal device 5 having a matrix array of thin-film transistors coupled to picture elements and being driven by a column integrated data driver circuit 7 and dual row select driver circuits 9a and 9b.

Figure 2:
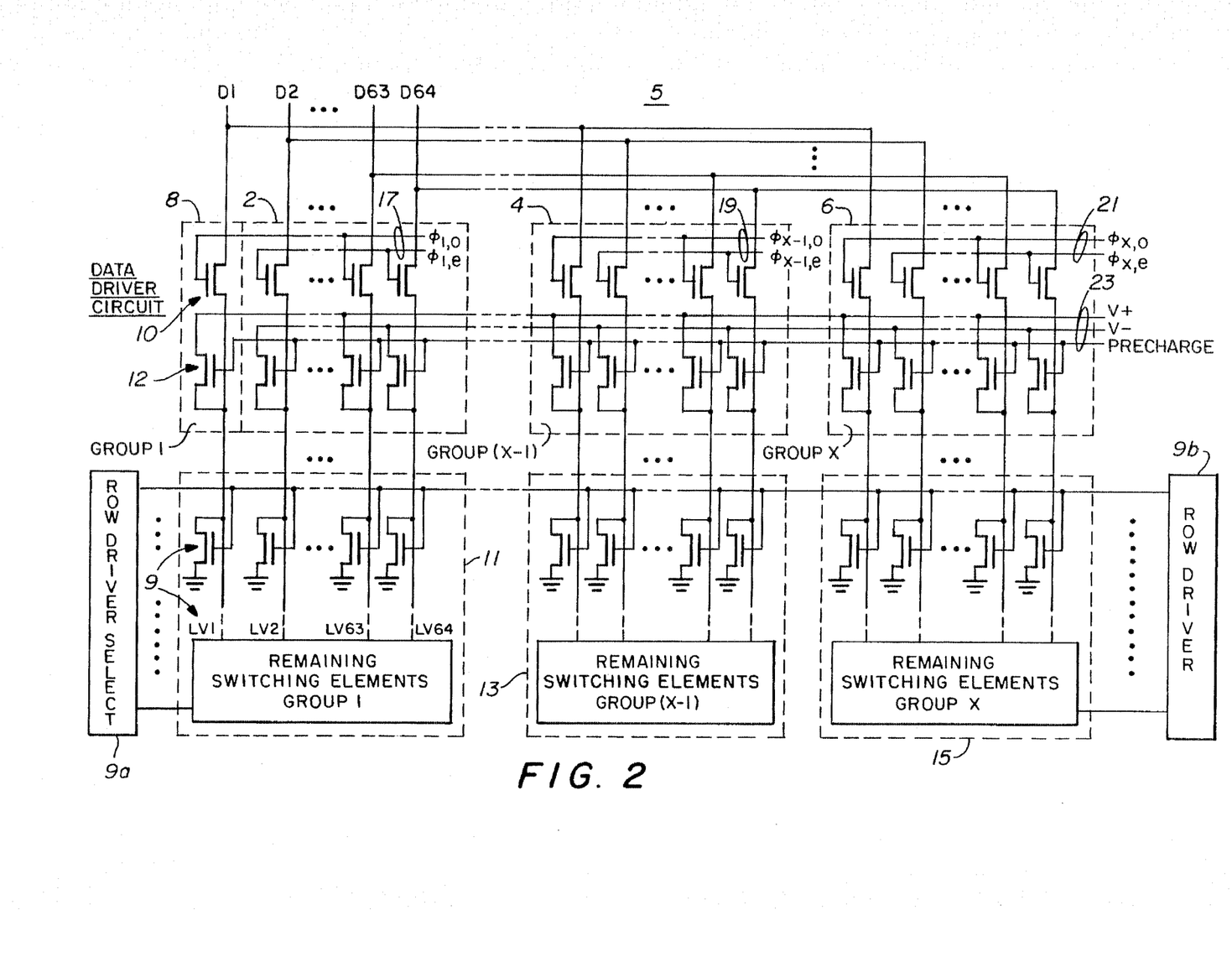
FIG. 2 illustrates the details of the integrated data driver circuit illustrated in FIG. 1.

A more detailed diagram of the display device 5 is shown in FIG. 2 illustrating the external control and driver signal circuits coupled to the integrated data driver circuit. The circuits shown in both FIG. 1 and FIG. 2 are disclosed in detail in commonly assigned copending U.S. patent application Ser. No. 971,721 filed Nov. 3, 1992 and entitled "Data Driving Circuit for LCD Display" and incorporated herein by reference in its entirety. The example shown in FIG. 2 is a display having 384 columns and 240 rows. In such case, 92,160 pixels are formed. All of the transistors in the data driving circuit are preferably thin-film transistors (TFT) deposited on the same substrate as the TFT array. This can be seen in FIG. 2 wherein a plurality, or X groups, of data driver circuits 2, 4, and 6 drive X groups of switching elements 9 in corresponding matrix areas 11, 13, and 15. The rows are driven by the opposed row driver circuits 9a and 9b.

As can be seen in FIG. 2, each data driver subcircuit, one of which is illustrated by the numeral 8 and enclosed in phantom lines, includes a demultiplexing transistor 10 and a precharging transistor 12. Input data lines D1–D64 are coupled in parallel to the X groups of data driving circuits 2, 4, and 6. The demultiplexing signal lines 17, 19, and 21 couple the 64 input lines to the X groups of switching elements sequentially. Thus the demultiplexing signal lines 17 couple the 64 input lines to the first group of switching elements 11, then demultiplexing signal lines 19 couple the 64 input lines to the next to the last group of switching elements X–1. Finally, the demultiplexing signal lines 21 couple the 64 input lines to the group X of switching elements. The predetermined V+ and V– voltage and precharging signal lines 23 are coupled to all of the precharging transistors 12.

It can be understood that if any of the elements in any given data driver subcircuit 8 or any of the components thereof are damaged in any fashion so they become inoperative, the entire column of pixel elements to which the driver circuit is connected becomes inoperative. This will obviously create a distorted display picture. As can be seen in FIG. 2, two transistors are formed as a single column driving subcircuit 8 for each given column data line. It can be seen that X pairs (17 ... 19, 21) of control signals (6 pairs in the example shown) are applied to the X groups of data driving circuits 2 ... 4, and 6 to demultiplex the Y (64) data signals and to couple them sequentially to X different groups (1–X) of Y columns in a selected one of Z (240) address rows on the display device. These control signals are $\phi_{1,o}$ and $\phi_{1,e}$, $\phi_{2,o}$ and $\phi_{2,e}$ ... $\phi_{X,o}$ and $\phi_{X,e}$. As disclosed in the commonly assigned co-pending application U.S. Ser. No. 971,721, the control signals $\phi_{1,o}$, and $\phi_{1,e}$ and $\phi_{2,o}$ and $\phi_{2,e}$, ..., $\phi_{X,o}$ and $\phi_{X,e}$ can be combined into $\phi_1, \phi_2, \ldots,$ and $\phi_x$, respectively, if the gate voltage stress is not a concern and the device characteristics of the demultiplexing transistors are good enough to discharge the internal lines.

Figure 3:
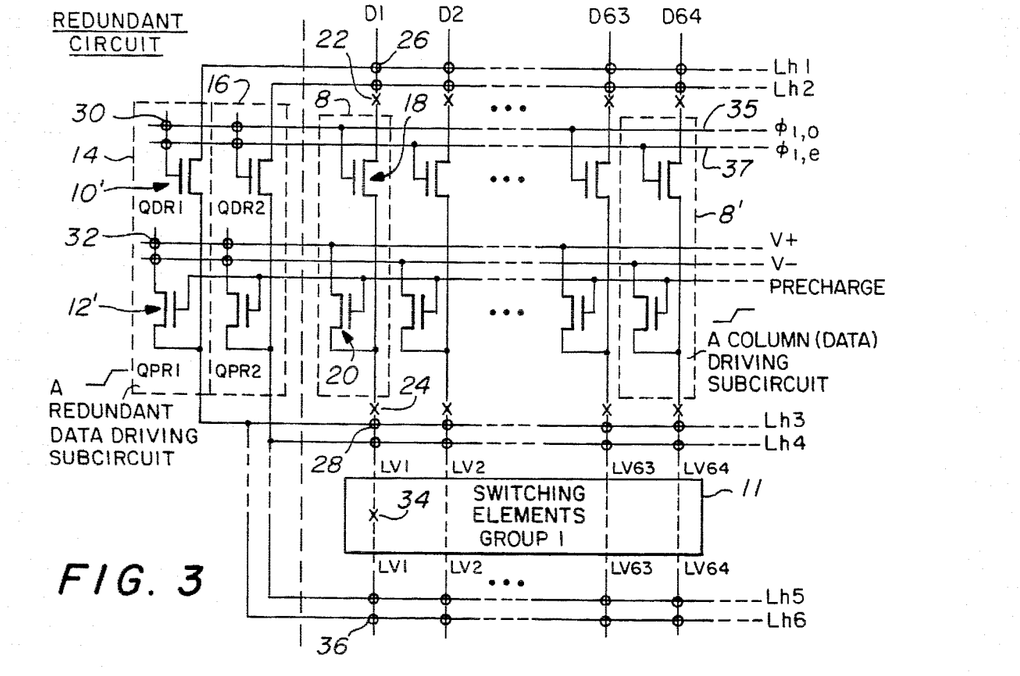
FIG. 3 illustrates a portion of the integrated data driver circuit illustrated in FIG. 2 and incorporating the redundant data driving circuits of the present invention.

In FIG. 3 a number of redundant column driving subcircuits 14 and 16 have been added to the data driving circuit. Although only two such subcircuits are illustrated here for clarity, clearly the number of redundant data driving circuits provided on this display can substantially equal the maximum allowable number of defects found in an acceptable display.

In FIG. 3, for each of the X groups of Y columns, Y data driving circuits 8 are utilized. Only two of the data driving circuits 8 and 8' are illustrated in phantom lines because all of the others are identical. Further, the redundant column data driving subcircuits 14 and 16 are illustrated in phantom lines and are shown related to the first group of switching elements 11. The circles 26 and the X's 22 in FIGS. 3 to 8 denote potential welding and cutting points respectively. The redundant circuits 14 and 16 are exact copies of a column driving subcircuit 8, 8' except that some of the connecting points to the control and driving signal lines are not hardwired. That is, the connecting points are left as potential welding points. For example, if the column driving subcircuit 8 coupled between the input data line, D1, and the internal data line, Lv1, entering the group 11 of switching elements is damaged, then a redundant data driving circuit 14 can be hardwired by welding the corresponding crossing points to compensate for the damaged subcircuit 8. The damaged subcircuit 8 is also disconnected from the corresponding input data line, D1, and the internal data line, Lv1, by using a laser cut or some compatible method. Thus a compensating redundant data driving circuit can be substituted for the damaged subcircuit by welding four crossing points and cutting two connecting points. For example, if the data driving circuit 8 is damaged, a cut can be formed at the point designated by X 22 and the point designated by X 24 effectively removing the data driving circuit 8 from the circuit. A weld can be formed at points designated by circles 26 and 28, thus connecting redundant data driving circuit in place thereof. In addition, the demultiplexing signal line 35 ($\phi_{1,o}$) can be welded at circle 30 as a gate signal input to transistor 10' and the corresponding V+ line can be welded at circle 32 to the input of the precharging transistor 12'. The precharging signal line itself is already hardwired to the gate of precharging transistor 12' in the redundant data driving circuit 14. Thus the data driving circuit 8 has been effectively replaced by the redundant data driving subcircuit 14. It can be seen that compensating the damaged subcircuit 8 in FIG. 3 can be done by welding four crossing points. These points are at 26, 28, 30, and 32. Further, the input and output of the damaged subcircuit 8, which couples to the data line, D1, and the internal data line, Lv1, are severed by cutting them at points 22 and 24 thus electrically removing damaged subcircuit 8 as a column driver.

Similarly, the redundant data driving subcircuit 14 or 16 can be used to compensate any other damaged column driving subcircuit in the first data driving circuit of X groups shown in FIG. 3. As a result, the total number of damaged column driving subcircuits that can be compensated equals the number of redundant subcircuits implemented. A similar redundant circuit can be used for the rest of the X groups. A potential welding spot is formed by two different metal plates with an insulation layer between them crossed at a predetermined point. The mechanism to short two metal plates that are overlapping but not contacted electrically can be accomplished in any well-known manner such as by the fusion method of laser welding. Another approach to electrically short two lines is a direct write method that is used for shorting two non-overlapping metal lines on the same layer. The direct write method can use either a laser or an electron beam. For example, one can use precursor such as $(CH_3)_2Au$ and laser energy to heat the predetermined open spot so that gold is deposited between two non-overlapping metal lines of the same layer to force them shorted. However, the laser welding method is used throughout the general description of the art and the examples described in this invention.

Figure 4:
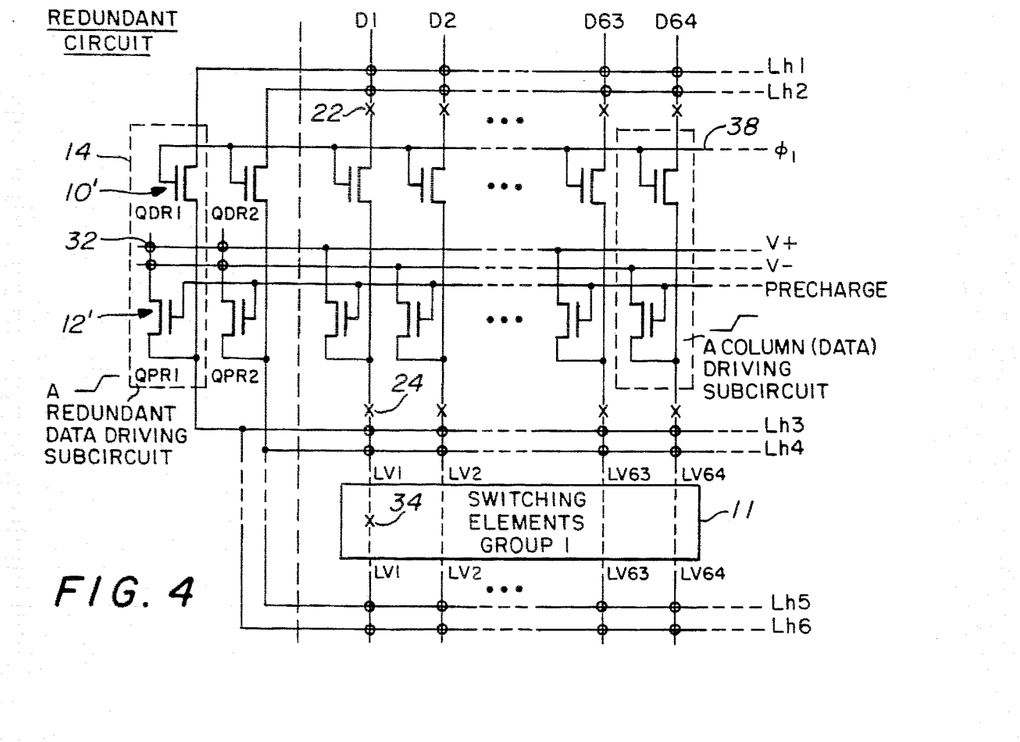
FIG. 4 is a diagram of the invention similar to that illustrated in FIG. 3 except that the circuit uses only one phase select line instead of two.
Figure 5:
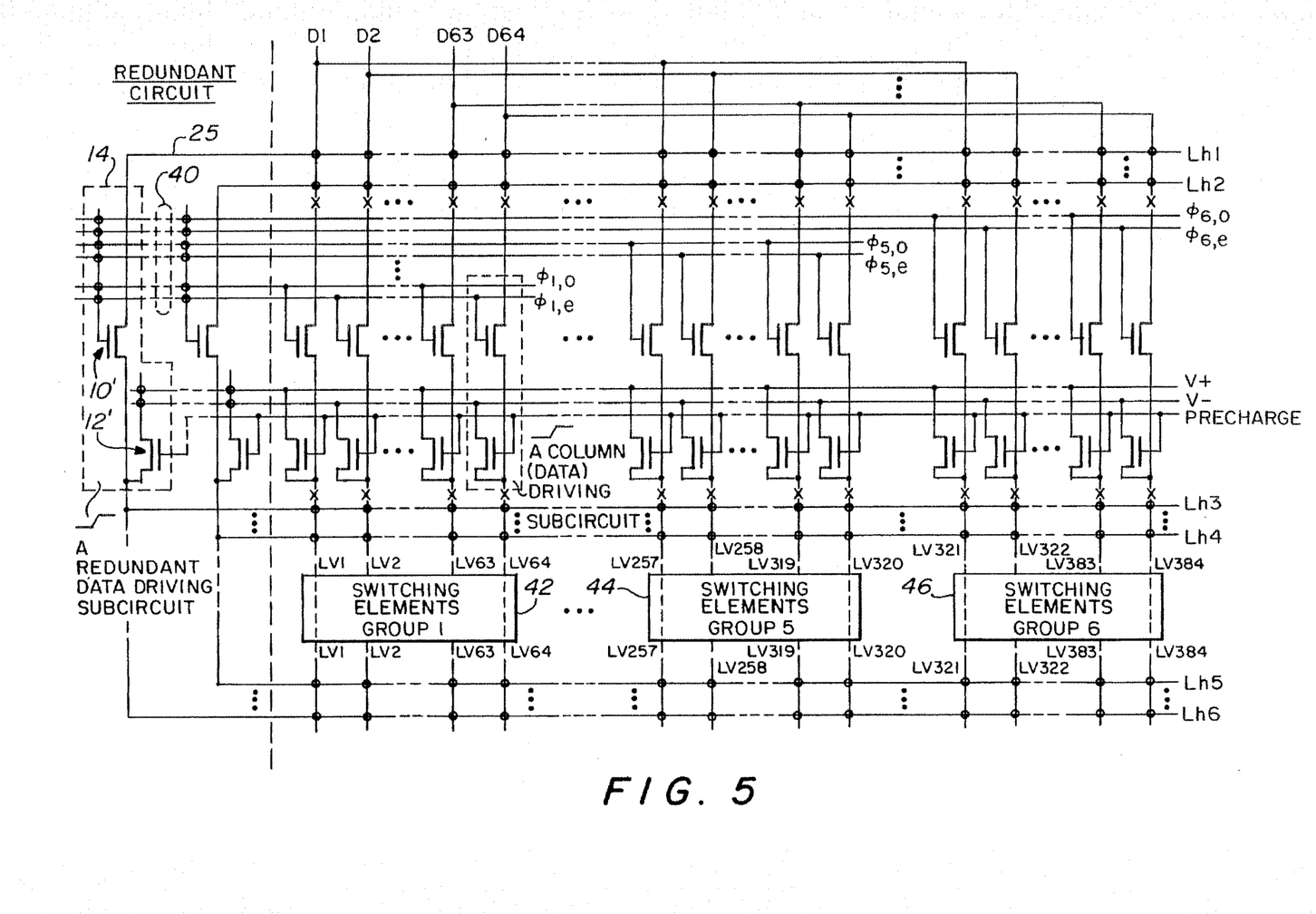
FIG. 5 illustrates an embodiment of the present invention wherein less redundant data driving subcircuits are needed but more complicated line connections are required.

As illustrated in FIG. 4, if the demultiplexing signals, $\phi_1$ odd and $\phi_1$ even, can be combined into one demultiplexing signal, $\phi_1$, on line 38, then no welding procedures are required at the crossing points to the gates of the demultiplexing transistors in redundant data driving subcircuit 14. Thus, as illustrated in FIG. 4, only three welding points and two cutting points are required. The weldings are at the intersections of, for example, Lh1 and D1, V+ and the input to a precharging transistor 12' and the intersection of Lh3 and Lv1 above the top of display area. The cutting, of course, takes place at points 22 and 24 as described earlier.

Another possible source of data line defects is a broken data line inside of the display area 11 illustrated in FIGS. 3 and 4 by the numeral 34. Since the portion of the column data line below an open circuit at point 34 is electrically disconnected from the data driving circuit, no signal can be passed through the open point. This is, of course, not acceptable for high quality display requirements. To overcome this problem, the same redundant data driving circuits 14 and 16 can be used as shown in FIGS. 3 and 4. By referring to FIG. 3, for instance, the internal data line, Lv1, is broken at point 34 somewhere inside display area 11. In this case, the redundant data driving circuit 14 or 16 can be hardwired to compensate the damaged internal data line by welding four crossing points to drive the bottom half of the internal data column line, Lv1, from the bottom of the display area 11. Thus redundant data driving circuit 14 can be welded at point 26, the intersection between data input line, D1, and line Lh1, at point 30, the demultiplexing signal line 35 ($\phi_{1,o}$) coupled to the gate of transistor 10', the V+ precharge voltage line to the precharging transistor at 32 and the intersection of Lh6 line and internal data column line, Lv1, at point 36 which, as can be seen, is below the bottom of the display area 11. This allows data driver circuit 8 to drive the internal data column line, Lv1, to display 11 from the top of display 11 and the redundant data circuit 14 to drive the same line from the bottom of the switching circuit 11 thus driving both ends of the line up to the damaged area 34.

The same argument can again be applied to the circuit in FIG. 4 but will require only three weldings for compensation because the gate of the data transistors 10' is already hardwired to the single demultiplexing signal line 38. As a result, the same redundant subcircuits 14 and 16 can be shared by both schemes for compensating for damage to column driving subcircuits and any broken internal data lines. Again, the total number of damaged column driving subcircuits and the broken internal data lines that can be compensated equals the number of redundant data driving subcircuits implemented on the substrate.

There are other ways to have the redundant data driving circuit implemented. One way is such that all the data driving circuits for all X group and Y columns are able to share the same set of redundant driving subcircuits. In such implementation, less redundant data driving subcircuits are usually needed but more complicated line connections may be required. Such implementation can be seen in FIG. 5 where the X groups of switching elements 42 . . . 44, and 46 may comprise, for example, 6 groups and all of the demultiplexing signal pairs are used in the circuit shown in FIG. 5. Thus, in FIG. 5, all of the demultiplexing signal lines for all six groups are shown at 40 overlapping the gate lines for the transistor 10'. In addition, the input line 25 to the transistor 10', Lh1, crosses all of the input lines D1–D64 for each of the six groups. In like manner, the output line of the transistor 10' overlaps all of the internal data lines Lv1–Lv384 both above and below the display area. Thus the redundant data driving subcircuit 14 can be substituted for any of the data driving circuits for the 64 columns×6 groups. Compensating a damaged subcircuit in FIG. 5 can be done by welding four crossing points and cutting two connecting points.

Figure 6:
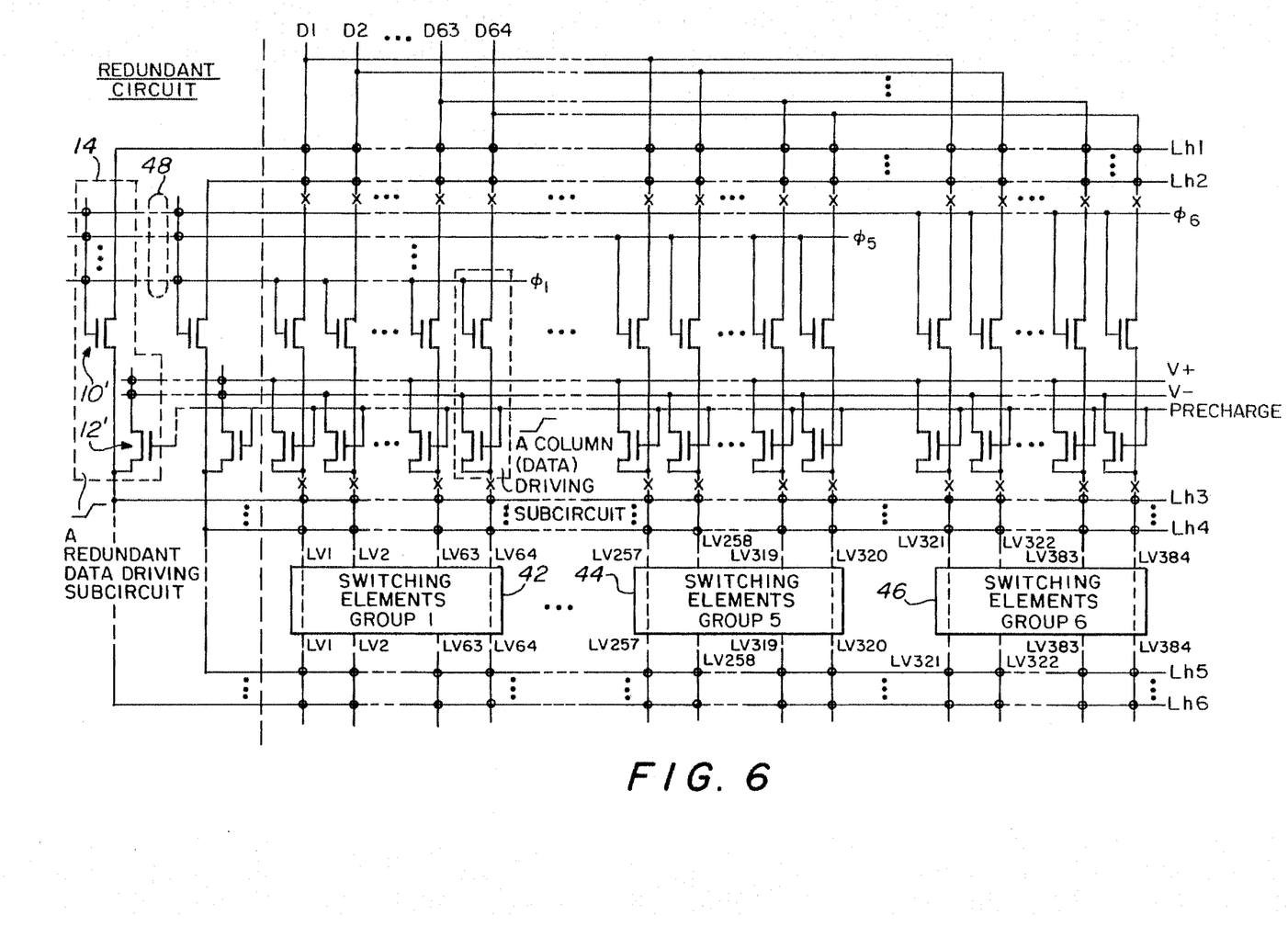
FIG. 6 is a circuit similar to that illustrated in FIG. 5 except that a single phase select line is used instead of two.

FIG. 6 illustrates the same scheme except that the demultiplexing signal lines are now reduced to X demultiplexing signals lines $\phi_1-\phi_x$ all of which overlap the input line to the gate of transistor 10' of redundant data driving circuit 14. Again, compensating a damaged subcircuit in FIG. 6 can be done by welding four crossing points and cutting two connecting points.

Figure 7:
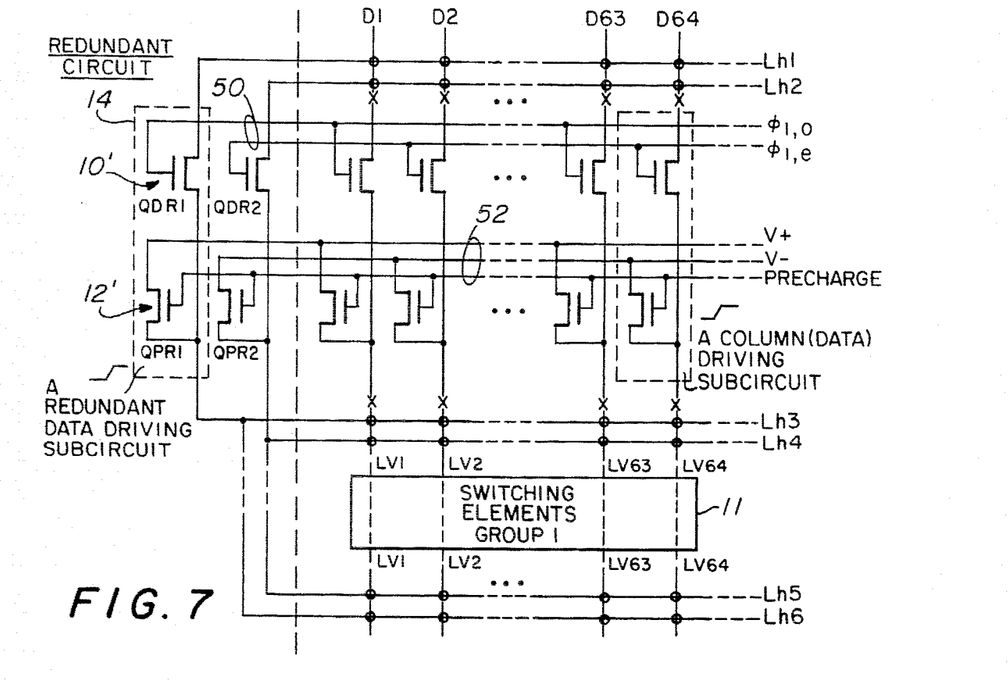
FIGS. 7 and 8 illustrate another manner of implementing the redundant data driving circuits using hardwired connections in certain locations to reduce the number of connections that must be formed by welding to cause the redundancy.
Figure 8:
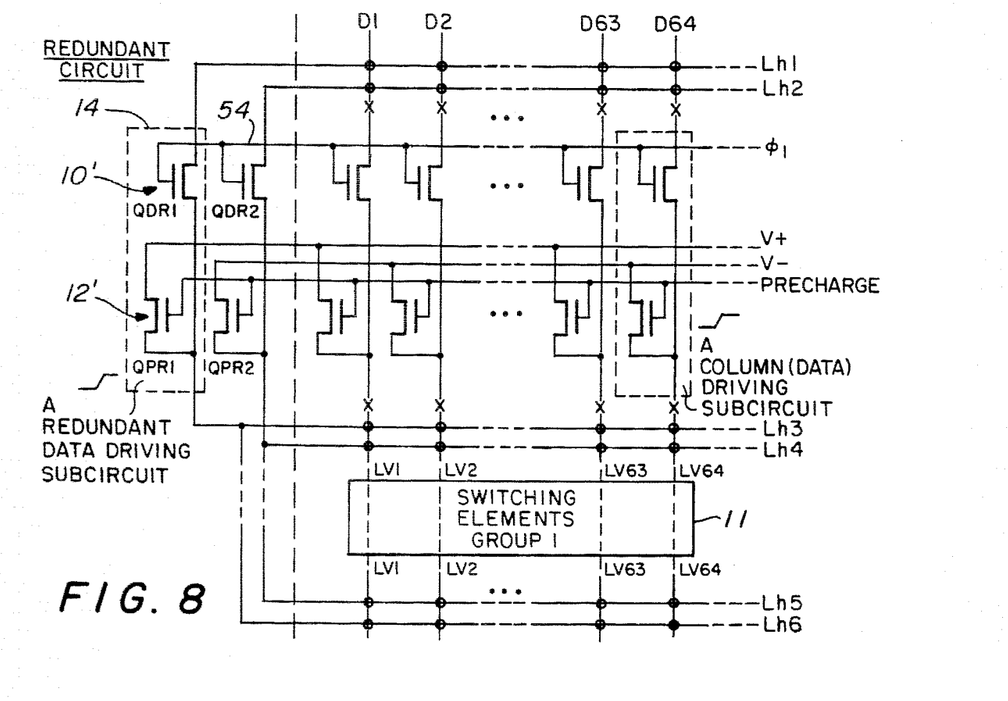

FIGS. 7 and 8 illustrate yet another way to implement the redundant data driving circuit 14. With the implementation shown in FIGS. 7 and 8, two less weldings and one less welding, respectively, are required in the repairing process when compared to the circuits illustrated in FIGS. 3 and 4, respectively. In FIGS. 7 and 8, since the redundant subcircuits 14 are already hardwired or connected to the V+, V− lines and the demultiplexing signal lines before repairing, only the input column lines D1 and the intersection of Lh1, and the output line Lh3 and the intersection of the input to the switching element group 1 on line Lv1, or the output of the switching elements of group 1 on line Lh6 need be welded. Again, it can be seen that the phase lines $\phi_{1,o}$ and $\phi_{1,e}$ group together as 50 in FIG. 7 and are hardwired and the V+, V− voltage and the precharge signal lines are designated by 52 and are also hardwired. Thus, no weldings are required at those points.

In FIG. 8 the demultiplexing signal lines have been reduced to one demultiplexing signal line 54 ($\phi_1$) thus still further reducing the number of weldings being required.

Another solution for compensation of a broken line inside a display area in the circuits shown in FIGS. 3, 4, 5, 6, 7, and 8 requires only two weldings for each broken internal data line compensation. If a broken point 34 exists inside a display area as shown in FIGS. 3 and 4 and the data driver subcircuit 8 functions correctly, for example, the damaged internal data line can be repaired by welding points 28 and 36 without using a redundant data driver circuit. In this case, the data driver subcircuit 8 drives the internal data line, Lv1, from both top and bottom of the display array.

Thus there has been disclosed a simple redundant data driver circuit for an LCD display with an integrated data driving circuit. The number of redundant data driving subcircuits required depends on the manufacturing yield in the areas of the integrated data driving circuit and data lines in the display area. If 10% defects are the maximum tolerance, then 10% redundant circuits could be added. The higher manufacturing yield and lower manufacturing costs can be achieved with the implementation of this newly invented redundant data driver circuit scheme.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

We claim:

1. A redundant data driver circuit system for a display having first and second opposed substrates separated by a layer of electro-optic material, the system including:

a plurality of picture elements arranged on said at least one substrate in a matrix array of M rows and N columns where both M and N are integers greater than 1;

a common column line for driving each of the M picture elements in each column, the common column line extending from a first input through said active matrix array to a first output;

a data source including a plurality of data lines;

a data driver circuit on said substrate coupled between a respective data source data line and the first input of each common column line to provide the data input to each column of picture elements;

at least one redundant data driver circuit on said at least one substrate having an input conductor and an output conductor; and the input conductor of the redundant data driver circuit crossing over and being connectable to the data source data line for all of the data driver circuits and the output conductor of the redundant data driver circuit crossing over and not being electrically connected to the first input of all of the common column lines such that a defective one of any of said data driver circuits is electrically disconnectable from both its respective data source data line and said first input of its associated common column line and replaceable by said at least one redundant data driver circuit by selectively electrically connecting the input conductor of said at least one redundant data driver circuit to said respective data source data line and connecting the output conductor to said first input of said associated common column line to which the disconnected defective data driver circuit had previously been connected.

2. A redundant data driver circuit as in claim 1 further comprising:

each data driver circuit having an input and an output data line;

the redundant data driver circuit input conductor crossing over, but not being electrically connected to, each of the data source data lines for all of the respective data driver circuits; and the redundant data driver circuit output conductor crossing over, but not being electrically connected to, all of said data driver circuit common column lines such that any defective data driver circuit is replaceable by a redundant data driver circuit by physically cutting the input data line to the defective data driver circuit and welding the redundant data driver circuit input conductor to the cut data source data line at the crossover and physically cutting the common column line connected to the defective data driver circuit and welding the redundant data driver circuit output conductor to the cut common column line at the crossover.

3. A data driver circuit system as in claim 1 further including:

said data driver circuits being arranged in X groups of Y data driver circuits;

X demultiplexing signal lines, each demultiplexing signal line being coupled to a corresponding one of the X groups of data drive circuits such that each of the X groups is sequentially enabled;

a demultiplexing input conductor that is connected to said at least one redundant data driver circuit and associated with, but not connected to, all of the X demultiplexing signal lines such that, the demultiplexing input conductor of said at least one redundant data driver circuit is connectable to any demultiplexing signal line in any of the X groups of data driver circuits thus enabling said at least one redundant data driver circuit to replace any defective data driver circuit in any of the X groups.

4. A data driver circuit system as in claim 3 wherein each of said X demultiplexing lines includes:

an odd phase demultiplexing input line and an even phase demultiplexing input line coupled to corresponding odd and even data driver circuits in each of said X groups of data driver circuits; and each of said odd and even phase demultiplexing lines in each of the X groups being associated with, but not connected to, said at least one redundant data driver circuit demultiplexing input conductor such that said at least one redundant data driver circuit is usable to replace any of said odd and even data driver circuits in any of said X groups.

5. A data driver circuit system as in claim 1 further comprising:

said redundant data driver circuit input conductor crossing over, but not being electrically connected to, each of the data source data lines for all of the respective data driver circuits; and the output conductor of each redundant data driver circuit crossing over, but not being electrically connected to, the first output of all of the common column lines after the $M^{th}$ picture element in each column such that any given column is drivable at its first input by its corresponding column data driver circuit and is drivable at its first output after the $M^{th}$ picture element by the redundant data driver circuit with the data source data line of the given column data driver circuit being electrically connected to the input conductor of the redundant data driver circuit at the crossover and the output conductor of the redundant data driver circuit being electrically connected to the first output of the given column line at the crossover after the $M_{th}$ picture element.

6. A data driver circuit system as in claim 1 further including:

a pixel capacitor forming a part of each pixel element;

a first precharge conducting element forming part of each data driver circuit and coupled to a corresponding pixel element;

a second precharge conducting element forming part of said at least one redundant data driver circuit;

a precharge voltage source coupled to the first precharge conducting element in all of the data driver circuits and associated with, but not electrically connected to, said second precharge conducting element in said redundant data driver circuit; and a precharge control line coupled to both said first and second precharge conducting elements in both the data driver circuits and the at least one redundant data driver circuit, respectively, for coupling the precharge voltage source only to a selected pixel capacitor such that when said defective one of any of said data driver circuits is replaced by said at least one redundant data driver circuit, said precharge voltage source is electrically connected to the second precharge conducting element of said redundant data driver circuit so as to allow the redundant data driver circuit to precharge the pixel capacitor associated with the replaced data driver circuit.

7. A data driver circuit system as in claim 6 wherein said precharge voltage source comprises:

a positive voltage source coupled to all odd data driver circuit first precharge conducting elements;

a negative voltage source coupled to all even data driver circuit first precharge conducting elements; and both of said positive and negative voltage sources crossing over, but not being electrically connected to, said second precharge conducting element of said at least one redundant data driver circuit such that the at least one redundant data driver circuit is usable to replace a defective one of either the odd or the even data driver circuits by electrically connecting the appropriate positive or negative voltage source to the second precharge conducting element at the crossover for the at least one redundant data driver circuit, respectively.

8. A data driver circuit system for correcting defects in a display formed of picture elements in rows and columns on a substrate, the data driver circuit system comprising:

a plurality of primary data driver circuits on the substrate, each primary data driver circuit having a first control input line for receiving control data signals and a second data input line for receiving column data signals and a data output line coupled to a corresponding column of the display for supplying data to said corresponding column;

at least one redundant data driver circuit on the substrate having an input control data conductor, an input column data conductor, and an output data conductor corresponding to the first control input line, the second output line, and the data output line, respectively, in each of the primary data driver circuits;

the input column data conductor of the redundant data driver circuit being associated with and crossing the corresponding second data input lines of all of the primary data driver circuits;

the input control data conductor of the redundant data driver circuit crossing and being connectable to the first control input data line of all of the primary data driver circuits; and the output data conductor of the redundant data driver circuit crossing and not being electrically connected to the data output line of all of the primary data driver circuits on the substrate for selectively enabling the replacement of any defective primary data driver circuit on the substrate with the at least one redundant data driver circuit by severing the input and output data lines and the control data line of the defective primary data driver circuit and electrically connecting at appropriate crossings the input column, control data, and output data conductors of the redundant data driver circuit to corresponding ones of the severed input column, control data, and output data lines to which the defective primary data driver circuit had been previously connected before being severed.

9. A data driver circuit system as in claim 8 wherein said primary data driver circuit and said at least one redundant data driver circuit include at least one amorphous silicon thin-film transistor.

10. A data driver circuit system as in claim 8 each column having an entering data line at one edge of the matrix and an exiting data line at the other edge of the matrix, the data driver circuit system further including:

the output data conductor of the at least one redundant data driver circuit crossing and not being electrically connected to all column exit data lines such that when a defect occurs between a predetermined column entering data line and the same column exiting data line, the redundant data driver circuit output column data conductor is electrically connected at appropriate crossings to both the entering data line receiving the predetermined column data signals and the same column data exiting line such that the predetermined column is driven from both edges of the matrix to ensure total column display by the picture elements.

* * * * *